(12) United States Patent
Hu

(10) Patent No.: US 12,425,657 B2
(45) Date of Patent: Sep. 23, 2025

(54) METHOD AND APPARATUS FOR DECODING POINT CLOUD MEDIA, AND METHOD AND APPARATUS FOR ENCODING POINT CLOUD MEDIA

(71) Applicant: Tencent Technology (Shenzhen) Company Limited, Guangdong (CN)

(72) Inventor: Ying Hu, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 89 days.

(21) Appl. No.: 18/235,685

(22) Filed: Aug. 18, 2023

(65) Prior Publication Data
US 2023/0396808 A1   Dec. 7, 2023

Related U.S. Application Data

(63) Continuation of application No. PCT/CN2022/135732, filed on Dec. 1, 2022.

(30) Foreign Application Priority Data

Mar. 11, 2022   (CN) .......................... 202210243282.2

(51) Int. Cl.
*H04N 19/70*   (2014.01)
*H04N 19/132*   (2014.01)
(Continued)

(52) U.S. Cl.
CPC ........... *H04N 19/70* (2014.11); *H04N 19/132* (2014.11); *H04N 19/136* (2014.11); *H04N 19/174* (2014.11); *H04N 19/186* (2014.11)

(58) Field of Classification Search
CPC .... H04N 19/70; H04N 19/132; H04N 19/136; H04N 19/174; H04N 19/186;
(Continued)

(56) References Cited

U.S. PATENT DOCUMENTS 11,558,643 B2 *   1/2023   Ramasubramonian ...................... H04N 19/70
11,562,509 B2 *   1/2023   Ramasubramonian ...................... G06T 15/30

(Continued)

FOREIGN PATENT DOCUMENTS

CN   114097229 A   2/2022
WO   WO-2021049333 A1 *   3/2021   ............... G06T 9/40

OTHER PUBLICATIONS

International Search Report and Written Opinion received for PCT Patent Application No. PCT/CN2022/135732, mailed on Feb. 14, 2023, 14 pages (6 pages of English Translation and 8 pages of Original Document).

*Primary Examiner* — Richard A Hansell, Jr.
(74) *Attorney, Agent, or Firm* — ARENTFOX SCHIFF LLP

(57) ABSTRACT

In a method for decoding point cloud media, point cloud media data including a plurality of point cloud samples encapsulated in one or more tracks is received. A compression unit of a point cloud sample in the plurality of point cloud samples is obtained. A media file data box of the point cloud sample includes type information that indicates a type of the compression unit. The type of the compression unit is one of a geometry header indicating a parameter set of geometry information, an attribute header indicating a parameter set of attribute information, a geometry slice indicating point cloud slice data of the geometry information, and an attribute slice indicating point cloud slice data of the attribute information. Whether the compression unit is to be decoded is determined according to the type information. The compression unit is decoded to obtain point cloud data based on the determination.

19 Claims, 11 Drawing Sheets

(51) Int. Cl.
*H04N 19/136* (2014.01)
*H04N 19/174* (2014.01)
*H04N 19/186* (2014.01)

(58) Field of Classification Search
CPC .... H04N 19/119; H04N 19/184; H04N 19/20; H04N 19/42; H04N 19/597; G06T 9/00
See application file for complete search history.

(56) References Cited

U.S. PATENT DOCUMENTS

| | | | |
|---|---|---|---|
| 12,010,341 B2* | 6/2024 | Oh | H04N 19/30 |
| 2021/0105492 A1* | 4/2021 | Aksu | H04N 21/2362 |
| 2021/0319571 A1 | 10/2021 | Oh | |
| 2022/0312035 A1* | 9/2022 | Takahashi | H04N 21/85406 |
| 2023/0145001 A1* | 5/2023 | Iguchi | H04N 19/597 |
| | | | 375/240.02 |
| 2023/0281923 A1* | 9/2023 | Gudumasu | H04N 19/597 |
| | | | 345/419 |
| 2023/0291918 A1* | 9/2023 | Takahashi | H04N 19/597 |
| 2024/0022773 A1* | 1/2024 | Hamza | H04N 19/136 |
| 2024/0430478 A1* | 12/2024 | Gudumasu | H04N 21/8456 |
| 2025/0005804 A1* | 1/2025 | Hendry | H04N 21/816 |
| 2025/0014232 A1* | 1/2025 | Han | G06T 9/40 |

\* cited by examiner

```
aligned(8) class GPCCSample
{
    unsigned int GPCCLength = sample_size; //Size of Sample
    for (i=0; i< GPCCLength; )           // to end of the sample
    {
    tlv_encapsulation gpcc_unit;
        i += (1+4)+ gpcc_unit.tlv_num_payload_bytes;
    }
}
```

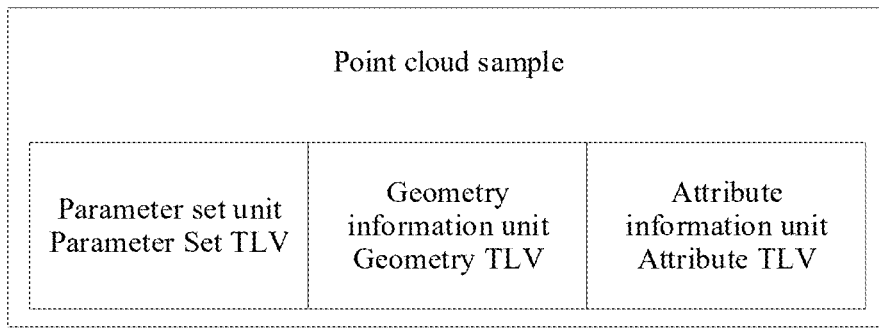
FIG. 5
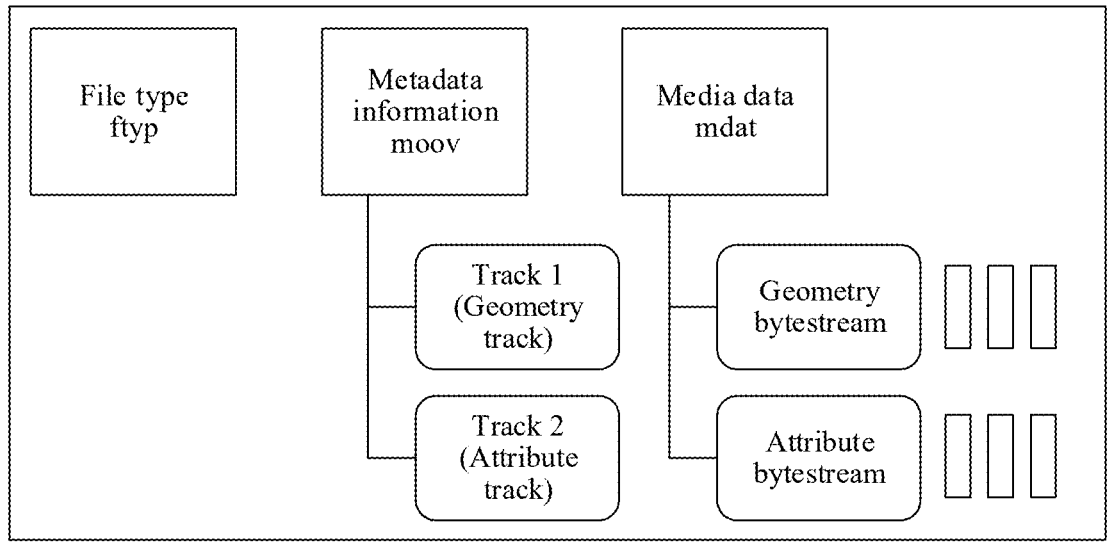
FIG. 6
| tlv_encapsulation( ) { | Descriptor |
|---|---|
| tlv_type | u(8) |
| tlv_num_payload_bytes | u(32) |
| for( i = 0; i < tlv_num_payload_bytes; i++ ) | |
| tlv_payload_byte[ i ] | u(8) |
| } | |
FIG. 7

```
aligned(8) class GPCCSample
{
unsigned int(8) num_component_headers;
unsigned int(8) num_slices;
for (i=0; i<num_component_headers; i++) {
unsigned int(8) header_type;
unsigned int(16) header_length;
        bit(8*header_length) header;
    }
    for(j=0; j<num_slices; j++){
    unsigned int(8) slice_type;
    unsigned int(32) slice_length;
    bit(8*slice_length) slice;
    }
}
```

FIG. 8

```
aligned(8) class GPCCSample
{
    unsigned int(8) num_component_headers;
    unsigned int(8) num_slices;
    for (i=0; i<num_component_headers; i++) {
        unsigned int(8) header_type;
        unsigned int(8) header_length;
        bit(8*header_length) header;
    }
    for(j=0; j<num_slices; j++){
        unsigned int(8) geo_slice_header_length;
        unsigned int(32) geo_slice_data_length;
        unsigned int(8) attr_slice_header_length;
        unsigned int(32) attr_slice_data_length;
        bit(8* geo_slice_header_length) geo_slice_header;
        bit(8* geo_slice_data_length) geo_slice_data;
        bit(8* attr_slice_header_length) attr_slice_header;
        bit(8* attr_slice_data_length) attr_slice_data;
    }
}
```

FIG. 9

```
if (flags == 0) {
        unsigned int(1)    geo_header_flag;
        unsigned int(1)    attr_header_flag;
        unsigned int(1)    geo_slice_flag;
        unsigned int(1)    attr_slice_flag;
        if (attr_slice_flag == 1)
            unsigned int(8)    attr_type;
        else
            bit(8)      reserved = 0;
            bit(20)     reserved = 0;
    }
```

FIG. 10

```
aligned(8) class GPCCComponentInfoBox
    extends FullBox('ginf', version = 0, 0) {
    unsigned int(8)    gpcc_type;
    if(gpcc_type == 4) {
            unsigned int(8)    attr_num;
            for(i=0; i<attr_num; i++){
              bit(4)              reserved = 0;
                unsigned int(4)    attr_type;
            }
        }
    }
}
```

FIG. 11

```
aligned(8) class GPCCComponentInfoBox
    extends FullBox('ginf', version = 0, 0) {
    unsigned int(8)     gpcc_type;
    if(gpcc_type == 4) {
            bit(4)              reserved = 0;
            unsigned int(4)     attr_type;
    }
}
```

FIG. 12

S1310
Obtain point cloud source data, the point cloud source data including a plurality of point cloud frames S1320
Encode the point cloud frames to obtain at least one compression unit S1330
Encapsulate the at least one compression unit to obtain a point cloud media file, the point cloud media file including point cloud samples encapsulated in one or more tracks, a media file data box of the point cloud sample including a type field for indicating a type of the compression unit, the type of the compression unit including any one of a geometry header for indicating a parameter set of geometry information, an attribute header for indicating a parameter set of attribute information, a geometry slice serving as point cloud slice data for indicating the geometry information, and an attribute slice serving as point cloud slice data for indicating the attribute information

FIG. 13

METHOD AND APPARATUS FOR DECODING POINT CLOUD MEDIA, AND METHOD AND APPARATUS FOR ENCODING POINT CLOUD MEDIA

RELATED APPLICATIONS

The present application is a continuation of International Application No. PCT/CN2022/135732 filed on Dec. 1, 2022, which claims priority to Chinese Patent Application No. 202210243282.2, filed on Mar. 11, 2022, and entitled "METHODS FOR ENCODING AND DECODING POINT CLOUD MEDIA, AND RELATED PRODUCTS." The entire disclosures of the prior applications are hereby incorporated by reference.

FIELD OF THE TECHNOLOGY

This disclosure is related to audio and video, including to a method for encoding point cloud media, a method for decoding point cloud media, an apparatus for encoding point cloud media, an apparatus for decoding point cloud media, a computer-readable medium, an electronic device, and a computer program product.

BACKGROUND OF THE DISCLOSURE

A point cloud can include a set of discrete points which are distributed irregularly in space and express spatial structures and surface attributes of a three-dimensional object or scene. After large-scale point cloud data is obtained by a point cloud acquisition device, the point cloud data may be encoded and encapsulated for transmission and presentation to a user. In the process of encoding transmission and decoding consumption, the point cloud media has the defects of large transmitted data volume and data redundancy. Therefore, there is a need to improve the flexibility of point cloud media encoding and decoding.

SUMMARY

A method for decoding point cloud media is provided. In the method for decoding point cloud media, point cloud media data is received. The point cloud media data includes a plurality of point cloud samples encapsulated in one or more tracks. At least a compression unit of a point cloud sample in the plurality of point cloud samples is obtained. A media file data box of the point cloud sample includes type information that indicates a type of the compression unit. The type of the compression unit is one of a geometry header indicating a parameter set of geometry information, an attribute header indicating a parameter set of attribute information, a geometry slice indicating point cloud slice data of the geometry information, and an attribute slice indicating point cloud slice data of the attribute information. Whether the compression unit is to be decoded is determined according to the type information. The compression unit is decoded to obtain point cloud data based on the compression unit being determined to be decoded.

A method for encoding point cloud media is provided. In the method for encoding point cloud media, point cloud data is received. The point cloud data includes a plurality of point cloud frames. The plurality of point cloud frames is encoded to obtain at least a compression unit. Point cloud media data that includes at least the compression unit is generated. The point cloud media data includes a plurality of point cloud samples encapsulated in one or more tracks. A media file data box of a point cloud sample in the plurality of point cloud samples includes type information that indicates a type of the compression unit. The type of the compression unit is one of a geometry header indicating a parameter set of geometry information, an attribute header indicating a parameter set of attribute information, a geometry slice indicating point cloud slice data of the geometry information, and an attribute slice indicating point cloud slice data of the attribute information.

An apparatus for decoding point cloud media is provided. The apparatus includes processing circuitry. The processing circuitry is configured to receive point cloud media data. The point cloud media data includes a plurality of point cloud samples encapsulated in one or more tracks. The processing circuitry is configured to obtain at least a compression unit of a point cloud sample in the plurality of point cloud samples, a media file data box of the point cloud sample including type information that indicates a type of the compression unit, the type of the compression unit being one of a geometry header indicating a parameter set of geometry information, an attribute header indicating a parameter set of attribute information, a geometry slice indicating point cloud slice data of the geometry information, and an attribute slice indicating point cloud slice data of the attribute information. The processing circuitry is configured to determine whether the compression unit is to be decoded according to the type information. The processing circuitry is configured to decode the compression unit to obtain point cloud data based on the compression unit being determined to be decoded An apparatus for encoding point cloud media is provided. The apparatus includes processing circuitry. The processing circuitry is configured to receive point cloud data. The point cloud data includes a plurality of point cloud frames. The processing circuitry is configured to encode the plurality of point cloud frames to obtain at least a compression unit. The processing circuitry is configured to generate point cloud media data that includes at least the compression unit. The point cloud media data includes a plurality of point cloud samples encapsulated in one or more tracks. A media file data box of a point cloud sample in the plurality of point cloud samples includes type information that indicates a type of the compression unit, the type of the compression unit being one of a geometry header indicating a parameter set of geometry information, an attribute header indicating a parameter set of attribute information, a geometry slice indicating point cloud slice data of the geometry information, and an attribute slice indicating point cloud slice data of the attribute information.

A non-transitory computer-readable storage medium stores instructions. The instructions, when executed by a processor, cause the processor to implement any of the methods for encoding and decoding point cloud media.

An electronic device is provided. The electronic device includes: a processor; and a memory for storing computer-readable instructions of the processor. The processor is configured to perform any of the methods for encoding and decoding point cloud media via execution of the computer-readable instructions.

A computer program product or computer program is provided. The computer program product or computer program includes computer-readable instructions. The computer-readable instructions are stored in a computer-readable storage medium. A processor of a computer device reads the computer-readable instructions from the computer-readable storage medium. The processor executes the computer-readable instructions, whereby the computer device performs any of the methods for encoding and decoding point cloud media.

BRIEF DESCRIPTION OF THE DRAWINGS

The accompanying drawings, which are incorporated in and constitute a part of this disclosure, illustrate exemplary embodiments of this disclosure. The accompanying drawings in the following description are only some embodiments of this disclosure. Other embodiments are within the scope of the present disclosure.

FIG. 5 shows an exemplary structure for encapsulating a geometry bytestream and an attribute bytestream in a single track according to one embodiment of this disclosure.

FIG. 6 shows an exemplary structure for encapsulating a geometry bytestream and an attribute bytestream in a plurality of tracks according to one embodiment of this disclosure.

FIG. 7 shows a syntax structure of a compression unit encapsulated based on a TLV format in one embodiment of this disclosure.

FIG. 8 shows a syntax structure for encapsulating point cloud samples based on a G-PCC compression mode in one embodiment of this disclosure.

FIG. 9 shows a syntax structure of a point cloud sample providing specific indication information of a point cloud slice in one embodiment of this disclosure.

FIG. 10 shows a syntax structure corresponding to specific parameters of a codec in a media file data box of a sub-sample according to one embodiment of this disclosure.

FIG. 11 shows a syntax structure of metadata information indicating the number of attributes in a multi-track encapsulation mode in one embodiment of this disclosure.

FIG. 12 shows a syntax structure of metadata information of an extended attribute type in a multi-track encapsulation mode in one embodiment of this disclosure.

FIG. 13 shows a flowchart of steps of a method for encoding point cloud media in one embodiment of this disclosure.

DESCRIPTION OF EMBODIMENTS

Figure 1:
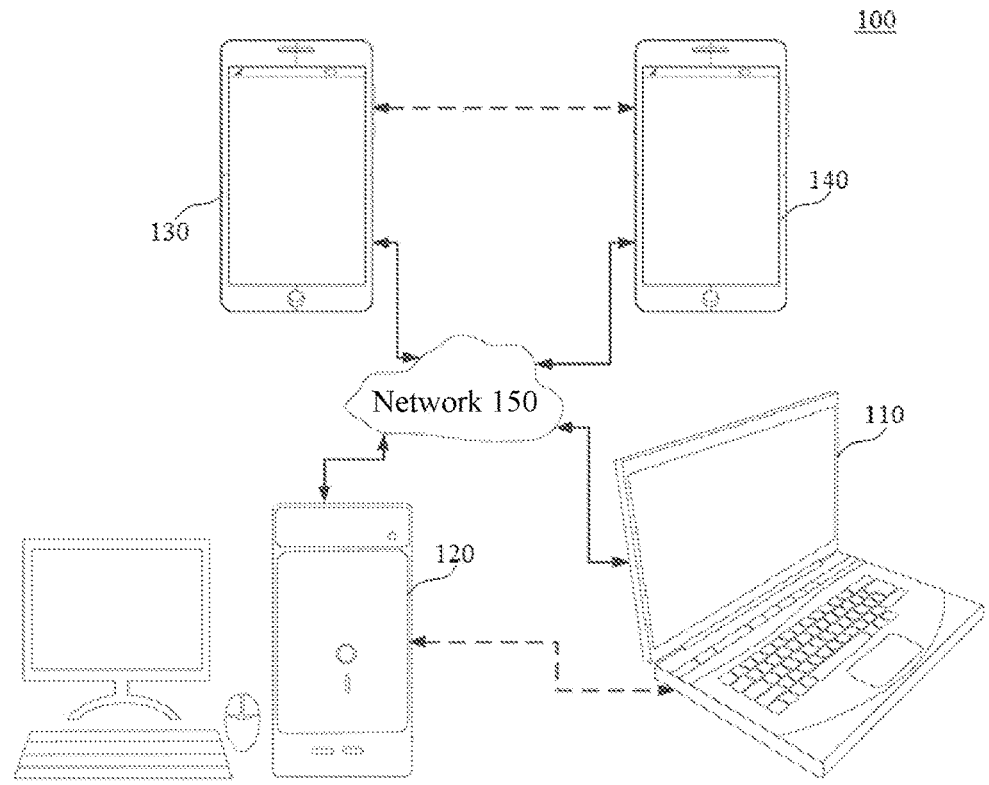
FIG. 1 shows a schematic diagram of an exemplary system architecture to which a technical solution according to an embodiment of this disclosure may be applied.

Exemplary implementations will now be described with reference to the accompanying drawings. However, the example implementations may be implemented in various forms, and it is not to be understood as being limited to the examples described herein.

In addition, the described features, structures or characteristics may be combined in one or more embodiments in any appropriate manner. In the following descriptions, details are provided to give a more comprehensive understanding of the embodiments of this disclosure. However, a person of ordinary skill in the art is to be aware that, the technical solutions in this disclosure may be implemented without one or more of the particular details, or another method, unit, apparatus, or step may be used.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality" mentioned herein means two or more than two. "And/or" describes an association relationship between associated objects, and represents that three relationships may exist. For example, A and/or B may represent the following three cases: Only A exists, both A and B exist, and only B exists. The character "/" generally represents that contextual objects are in an "or" relationship.

In implementations of this disclosure, user-related data such as transmission content, decoding content, and consumption content of point cloud media are involved. When the various embodiments of this disclosure are applied to a particular product or technology, user approval or consent is required, and collection, use and processing of the relevant data is required to comply with relevant national and regional laws and regulations and standards.

Examples of related terms or abbreviations referred to in the embodiments of this disclosure are explained as follows.

Immersive Media: The immersive media is, for example, media content capable of bringing an immersive experience to a consumer, and may be divided into 3DoF media, 3DoF+ media, and 6DoF media according to degrees of freedom of a user when consuming the media content. Point cloud media is a typical 6DoF media.

DoF: Degree of Freedom (DoF) refers to, for example, a degree of freedom of movement supported by the user while viewing immersive media and creating content interaction.

3DoF: Three degrees of freedom (3DoF) refers to, for example, three degrees of freedom in which the head of the user rotates about x, y, and z axes.

3DoF+: On the basis of 3DoF, the user also has a degree of freedom in which the user performs limited movement along the x, y, and z axes.

6DoF: On the basis of 3DoF, the user also has a degree of freedom in which the user performs free movement along the x, y, and z axes.

Point Cloud: A point cloud includes, for example, a set of discrete points which are distributed irregularly in space and express spatial structures and surface attributes of a three-dimensional object or scene. Each point in the point cloud has at least three-dimensional position information, and may also have color, material, or other information depending on application scenes. Typically, each point in the point cloud has the same number of additional attributes.

PCC: Point Cloud Compression.

G-PCC: Geometry-based Point Cloud Compression.

Sample: The sample is, for example, an encapsulation unit in an encapsulation process of a media file, and one media file is composed of many samples. Taking video media as an example, a sample of video media is typically a video frame.

DASH: Dynamic adaptive streaming over HTTP. HTTP-based dynamic adaptive streaming is an adaptive bit rate streaming technology, whereby high-quality streaming media may be delivered over the Internet through a traditional HTTP network server.

MPD: Media presentation description, which is a media presentation description signaling in DASH and used for describing media segment information.

Representation: Combination of one or more media components in DASH. For example, a video file of a certain resolution may be viewed as a representation.

Adaptation Sets: Sets of one or more video streams in DASH. One adaptation set may contain a plurality of representations.

Media Segment: Media segment. The media segment includes, for example, a playable segment which meets a certain media format. The media segment may be required to match with zero or more preceding segments and initialization segments.

The point cloud media may be divided into video-based point cloud compression (VPCC) based on traditional video encoding and geometry-based point cloud compression (GPCC) based on geometry features. In the encapsulation of a point cloud media file, three-dimensional position information is commonly referred to as a geometry component of the point cloud media file, and attribute information is referred to as an attribute component of the point cloud media file. One point cloud media file has only one geometry component, but may have one or more attribute components.

Point cloud may express spatial structures and surface attributes of three-dimensional objects or scenes flexibly and conveniently, and therefore the point cloud is widely used. The main application scenes thereof may be divided into two classes. 1) Machine Perception Point Cloud: a computer aided design (CAD), an autonomous navigation system (ANS), a real-time patrol system, a geography information system (GIS), a visual sorting robot, and a disaster relief robot. 2) Human Eye Perception Point Cloud: a point cloud application scene such as virtual reality (VR) games, digital cultural heritage, free viewpoint broadcasting, three-dimensional immersive communication, and three-dimensional immersive interaction.

The point cloud nay be obtained in the following ways: computer generation, 3D laser scanning, 3D photogrammetry, and the like. A computer may generate point clouds of virtual three-dimensional objects and scenes. 3D scanning may obtain point clouds of static real-world three-dimensional objects or scenes, and millions of point clouds may be obtained per second. 3D photography may obtain point clouds of dynamic real-world three-dimensional objects or scenes, and tens of millions of point clouds may be obtained per second. Furthermore, in the medical field, point clouds of biological tissue organs may be obtained from MRI, CT, and electromagnetic positioning information. These technologies reduce the cost and time period of point cloud data obtaining and improve the accuracy of data. The transformation of point cloud data obtaining makes it possible to obtain a large number of point cloud data. With the continuous accumulation of large-scale point cloud data, the efficient storage, transmission, distribution, sharing, and standardization of point cloud data become the key of point cloud application.

FIG. 1 shows a schematic diagram of an exemplary system architecture to which a technical solution according to an embodiment of this disclosure may be applied.

As shown in FIG. 1, a system architecture 100 includes a plurality of terminals. The terminals may communicate with each other through, for example, a network 150. For example, the system architecture 100 may include a first terminal 110 and a second terminal 120 interconnected through the network 150. In the embodiment of FIG. 1, the first terminal 110 and the second terminal 120 perform unidirectional data transmission.

For example, the first terminal 110 may encode point cloud data (for example, point cloud data acquired by the terminal 110) for transmission over the network 150 to the second terminal 120. The encoded point cloud data is transmitted in one or more encoded point cloud bytestreams (or bitstreams). The second terminal 120 may receive the encoded point cloud data from the network 150, decode the encoded point cloud data to restore the point cloud data, and display point cloud content according to the restored point cloud data.

In one embodiment of this disclosure, the system architecture 100 may include a third terminal 130 and a fourth terminal 140 that perform bi-directional transmission of the encoded point cloud data. The bi-directional transmission may occur, for example, during a video conference. For bi-directional data transmission, each of the third terminal 130 and the fourth terminal 140 may encode point cloud data (for example, point cloud data acquired by the terminal) for transmission over the network 150 to the other of the third terminal 130 and the fourth terminal 140. Each of the third terminal 130 and the fourth terminal 140 may also receive the encoded point cloud data transmitted by the other of the third terminal 130 and the fourth terminal 140, may decode the encoded point cloud data to restore the point cloud data, and may display point cloud content on an accessible display apparatus according to the restored point cloud data.

In the embodiment of FIG. 1, the first terminal 110, the second terminal 120, the third terminal 130, and the fourth terminal 140 may be a server, a personal computer or a smart phone, but the principles disclosed in this disclosure may not be limited thereto. The embodiment disclosed in this disclosure is applicable to various devices such as laptop computers, tablet computers, media players, and/or dedicated video conferencing devices. The network 150 represents any number of networks that transfer the encoded point cloud data between the first terminal 110, the second terminal 120, the third terminal 130, and the fourth terminal 140, including, for example, wired and/or wireless communication networks. The communication network 150 may exchange data in circuit-switched and/or packet-switched channels. The network may include a telecommunications network, a local area network, a wide area network, and/or the Internet. For purposes of this disclosure, unless explained below, the architecture and topology of the network 150 may be insignificant to the operation disclosed in this disclosure.

The server in this embodiment of this disclosure may be an independent physical server, may also be a server cluster or distributed system composed of, or includes, multiple physical servers, and may also be a cloud server providing cloud computing services. The terminal may be a smartphone, a tablet computer, a notebook computer, a desktop computer, a smart speaker, a smartwatch, a vehicle-mounted terminal, a smart television, or the like, but is not limited thereto. The terminal and the server may be directly or indirectly connected in a wired or wireless communication manner. This disclosure is not limited herein.

After the point cloud media is encoded, an encoded data stream needs to be encapsulated and transmitted to a user. Accordingly, a point cloud file needs to be first decapsulated and then decoded at a point cloud media player, and a decoded data stream is presented finally.

Figure 2:
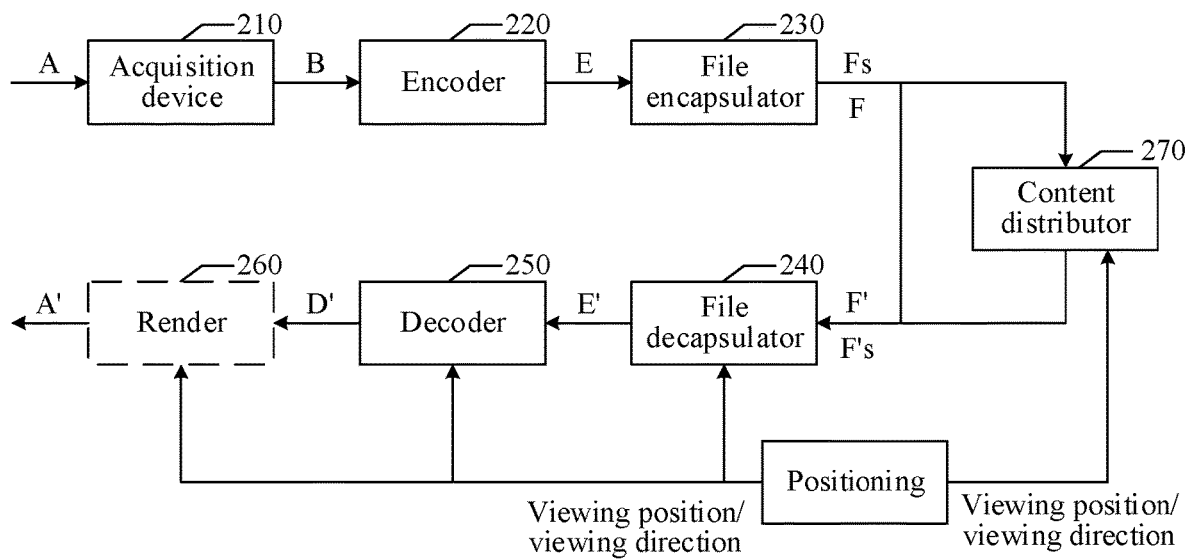
FIG. 2 shows a schematic diagram of processes of encoding and decoding point cloud media in an application scene according to an embodiment of this disclosure.

FIG. 2 shows a schematic diagram of processes of encoding and decoding point cloud media in an application scene according to an embodiment of this disclosure.

A real world visual scene A may be captured by point cloud data acquisition via an acquisition device 210. The acquisition device 210 may be, for example, a group of cameras or a camera device having a plurality of lenses and sensors. An acquisition result is point cloud source data B. The point cloud source data B is a frame sequence composed of, or includes, a large number of point cloud frames. An encoder 220 may encode one or more point cloud frames to obtain an encoded G-PCC bitstream, and specifically may include an encoded geometry bitstream and attribute bitstream E. A file encapsulator 230 may encapsulate one or more encoded bitstreams according to a particular media container file format to obtain a media file F for file playback or a series of initialization segments and media segments Fs for streaming transmission. In some embodiments of this disclosure, the media container file format may be, for example, an ISO base media file format (ISOBMFF) specified in ISO/IEC 14496-12 ISOBMFF. The file encapsulator 230 may also encapsulate metadata in the media file F or the media segments Fs.

The media file F outputted by the file encapsulator 230 is the same as a media file F' inputted to a file decapsulator 240. The file decapsulator may extract an encoded bitstream E' and parse the metadata by processing the media file F' or processing a received media segment F's. A decoder 250 may decode the G-PCC bitstream into a decoded signal D' and generate point cloud data according to the decoded signal D'. The point cloud data may be rendered and displayed on a screen of a head-mounted display or any other display device by a renderer 260 based on a current viewing position, viewing direction or viewport determined by various types of sensors (such as head-mounted sensors), as applicable. In addition to being used by a player to access appropriate portions of the decoded point cloud data, the current viewing position or viewing direction may also be used for decoding optimization. In a viewport dependent content distributor 270, the current viewing position and viewing direction are also transferred to a policy module. The policy module may be configured to determine a track to be received.

In a transmission technology of point cloud media, a streaming transmission technology is generally adopted to process the transmission of media resources between a server and a client. Common media streaming transmission technologies include DASH, HTTP live streaming (HLS), smart media transport (SMT), and the like.

DASH is taken as an example. DASH is an adaptive bit rate streaming technology, whereby high-quality streaming media may be delivered over the Internet through a traditional HTTP network server. DASH decomposes content into a series of small HTTP-based file segments. Each segment contains playable content of a very short length, and a total length of the content may be up to several hours (for example, live movies or sporting events). The content will be made into alternate segments at multiple bit rates to provide multiple bit rate versions for selection. When media content is played by a DASH client, the client will automatically download and play a certain alternative according to current network conditions. The client will play a highest bit rate segment that may be downloaded in time, thereby avoiding playing jams or re-buffering events. As such, the DASH client may seamlessly adapt to changing network conditions and provide a high-quality playing experience with fewer occurrences of jams and re-buffering.

DASH uses the existing HTTP network server infrastructure. Devices such as Internet televisions, television set-top boxes, desktop computers, smartphones, and tablet computers are allowed to consume multimedia content (such as video, television, or broadcast) delivered over the Internet and to cope with changing Internet receiving conditions.

The technical solutions of a method for encoding point cloud media, a method for decoding point cloud media, an apparatus for encoding point cloud media, an apparatus for decoding point cloud media, a computer-readable storage medium, an electronic device, and a computer program product provided in this disclosure are described in detail with reference to specific exemplary implementations. The technical solutions of the embodiments of this disclosure may be applied to a server, a player, an intermediate node, etc. of an immersive media system.

Figures 3, 4:
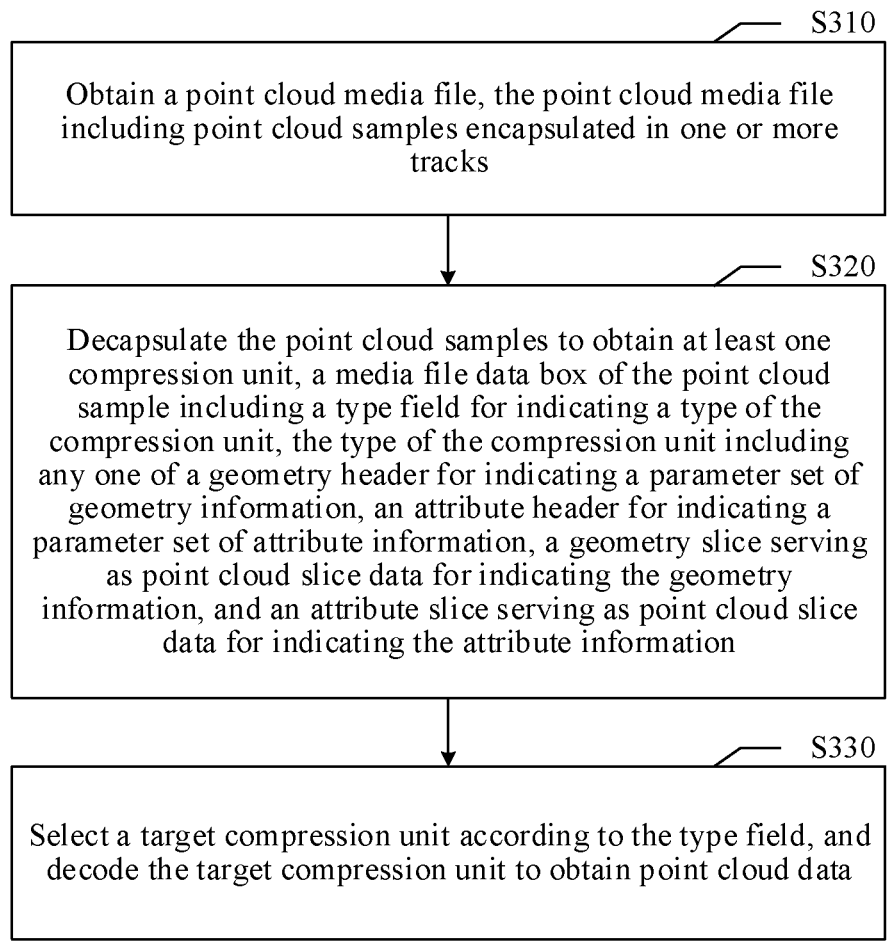
FIG. 3 shows a flowchart of steps of a method for decoding point cloud media in one embodiment of this disclosure.
FIG. 4 shows a syntax structure for encapsulating point cloud samples based on a tag-length-value (TLV) format in one embodiment of this disclosure.

FIG. 3 shows a flowchart of steps of a method for decoding point cloud media in one embodiment of this disclosure. The method may be applied to links such as a server, a terminal (or a client running on the terminal), and an intermediate node of a point cloud media system. This embodiment of this disclosure describes an example in which an electronic device installed with an apparatus for decoding point cloud media performs the method for decoding point cloud media. As shown in FIG. 3, the method for decoding point cloud media includes step S310 to step S330 as follows.

In step S310, a point cloud media file is obtained, the point cloud media file including point cloud samples encapsulated in one or more tracks.

The point cloud media file may be a media file or a media segment obtained after encoding and encapsulation processing as shown in FIG. 2. The media file or the media segment carries a point cloud bytestream to be transmitted.

In one embodiment of this disclosure, a data source may encapsulate the point cloud bytestream into a single track according to geometry parameter information, attribute parameter information, and parameter information of a point cloud slice contained in the point cloud bytestream, or may also re-encapsulate the point cloud media file of the single track into a point cloud media file containing a plurality of tracks. The data source is an electronic device for producing the point cloud media file, such as a server. If the electronic device performing the method for decoding point cloud media is a terminal, the terminal may obtain the point cloud media file from the server. If the electronic device performing the method for decoding point cloud media is the server, the electronic device may directly obtain the point cloud media file.

The track refers to a volumetric visual track for carrying an encoded geometry bitstream or an encoded attribute bitstream, or may be a volumetric visual track carrying both the encoded geometry bitstream and the encoded attribute bitstream.

In a case that point cloud bytestreams are encapsulated in a single track, each point cloud sample may correspond to a complete point cloud frame.

In step S320, the point cloud samples are decapsulated to obtain at least one compression unit. A media file data box of the point cloud sample includes a type field for indicating a type of the compression unit. The type of the compression unit includes any one of a geometry header for indicating a parameter set of geometry information, an attribute header for indicating a parameter set of attribute information, a geometry slice serving as point cloud slice data for indicating the geometry information, and an attribute slice serving as point cloud slice data for indicating the attribute information.

The media file data box may be an ISOBMFF-based data box. For an example of the ISOBMFF, reference may be made to the standard ISO/IEC 14496-12.

When a G-PCC bytestream is carried in the single track, a simple ISOBMFF encapsulation may be utilized without further processing by storing the G-PCC bytestream in the single track.

FIG. 4 shows a syntax structure for encapsulating point cloud samples based on a TLV format in one embodiment of this disclosure. Each point cloud sample is composed of, or includes, one or more compression units (G-PCC unit).

FIG. 5 shows an exemplary structure for encapsulating a geometry bytestream and an attribute bytestream in a single track according to one embodiment of this disclosure. As shown in FIG. 5, in a single-track encapsulation mode, one point cloud sample may include one or more compression units encapsulated based on a TLV format, which may include, for example, a parameter set TLV, a geometry TLV, and an attribute TLV in FIG. 5.

A TLV bytestream format, namely a type-length-value bytestream format, refers to a structure composed of, or including, a type of data, a length of data, and a value of data. For an example of the TLV bytestream format, reference may be made to the standard ISO/IEC 23090-9.

FIG. 6 shows an exemplary structure for encapsulating a geometry bytestream and an attribute bytestream in a plurality of tracks according to one embodiment of this disclosure. ftyp represents a file type and describes a version of a specification to which a point cloud sample complies; moov represents metadata of a point cloud sample; and mdat represents specific media data carried in the point cloud sample.

As shown in FIG. 6, in a multi-track encapsulation mode, bytestream data of each point cloud component is mapped into a separate track. A G-PCC component track is available in two types: a G-PCC geometry track and a G-PCC attribute track. Each point cloud sample in the track contains at least one G-PCC unit, which carries a single G-PCC component data unit instead of multiplexing of geometry and attribute data units or different attribute data units. The G-PCC attribute track is not required to multiplex different attribute sub-streams, such as color and reflectivity.

FIG. 7 shows a syntax structure of a compression unit encapsulated based on a TLV format in one embodiment of this disclosure. tiv_type is a type field for indicating a type of a compression unit. Table 1 shows a semantic description of different values of compression unit type fields in one embodiment of this disclosure.

TABLE 1

| tlv_type | Description |
| --- | --- |
| 0 | Sequence parameter set |
| 1 | Geometry parameter set |
| 2 | Geometry data unit |
| 3 | Attribute parameter set |
| 4 | Attribute data unit |
| 5 | Tile inventory |
| 6 | Frame boundary marker |
| 7 | Geometry header |
| 8 | Attribute header |
| 9 | Geometry slice |
| 10 | Attribute slice |

As shown in Table 1, type fields of different values may be used for indicating different compression unit types.

The type of the compression unit is a sequence parameter set (SPS) in a case that the type field has a value of 0.

The type of the compression unit is a geometry parameter set (GPS) in a case that the type field has a value of 1.

The type of the compression unit is a geometry data unit in a case that the type field has a value of 2.

The type of the compression unit is an attribute parameter set (APS) in a case that the type field has a value of 3.

The type of the compression unit is an attribute data unit in a case that the type field has a value of 4.

The type of the compression unit is a tile inventory in a case that the type field has a value of 5.

The type of the compression unit is a frame boundary marker in a case that the type field has a value of 6.

For examples of the above types of the compression unit, reference may be made to the standard ISO/IEC 23090-9.

In order to provide indication information of more specific point cloud components to enable more flexible transmission and decoding of point cloud media files according to actual point cloud consumption requirements, embodiments of this disclosure may also provide a semantic description of the type field of the compression unit as follows.

The type of the compression unit is a geometry header for indicating a geometry information parameter set in a case that the type field has a value of 7.

The type of the compression unit is an attribute header for indicating an attribute information parameter set in a case that the type field has a value of 8.

The type of the compression unit is a geometry slice for indicating geometry information point cloud slice data in a case that the type field has a value of 9.

The type of the compression unit is an attribute slice for indicating attribute information point cloud slice data in a case that the type field has a value of 10.

In this embodiment of this disclosure, the G-PCC unit includes any one of a geometry header, an attribute header, a geometry slice, and an attribute slice. The G-PCC unit in the same point cloud sample corresponds to the same point cloud frame and has the same presentation time.

In step S330, a target compression unit is selected according to the type field, and the target compression unit is decoded to obtain point cloud data.

By providing a type field of a compression unit in a media file data box, the electronic device may use different field values to indicate that the compression unit to be decoded is a geometry header, an attribute header, a geometry slice, or an attribute slice, whereby partial file content may be selectively decoded according to the consumption requirements of point cloud media without decoding the whole file content. Therefore, not only the flexibility of point cloud data consumption can be improved, but also the decoding efficiency of the point cloud data can be significantly improved and the consumption of computing resources can be reduced.

In one embodiment of this disclosure, the media file data box of the point cloud sample may further include a component header number field and a slice number field.

The component header number field num_component_headers indicates the number of geometry header parameter sets and attribute header parameter sets included in the point cloud sample.

The slice number field num_slices indicates the number of point cloud slices included in the point cloud sample, namely, the number of geometry slices and attribute slices.

In one embodiment of this disclosure, the geometry header parameter set and the attribute header parameter set are decoder configuration information in a case that the component header number field has a value of 0.

FIG. 8 shows a syntax structure for encapsulating point cloud samples based on a G-PCC compression mode in one embodiment of this disclosure.

The component header number field num_component_headers is used for indicating the number of geometry header and attribute header parameter sets contained in a current point cloud frame. The corresponding geometry header and attribute header parameter sets are given in the decoder configuration information if the field has a value of 0.

The slice number field num_slices is used for indicating the number of point cloud slices contained in the current point cloud frame.

For a component header portion, the following fields of indication information may be provided.

A header type field header type is used for indicating whether a type of a parameter set is a geometry header or an attribute header. The parameter set is a geometry header parameter set in a case that the field has a value of 1. The parameter set is an attribute header parameter set in a case that the field has a value of 2.

A header length field header length is used for indicating a length of the parameter set.

A header data field header is used for indicating data in the parameter set. The parsing of the field follows the definition of the parameter set in the corresponding encoding standard.

For a point cloud slice portion, the following fields of indication information may be provided.

A slice type field slice type is used for indicating a type of a point cloud slice, and may specifically include a point cloud geometry slice and a point cloud attribute slice corresponding to different attribute information.

A slice length field slice length is used for indicating a length of the point cloud slice. The point cloud slice contains a corresponding point cloud slice header and data information.

A slice data field slice is used for indicating data in the point cloud slice. The parsing of the field follows the definition of the point cloud slice header and the data information in the corresponding encoding standard.

In one embodiment of this disclosure, the type of the point cloud slice is a point cloud geometry slice in a case that the slice type field has a first value. The type of the point cloud slice is a point cloud color attribute slice in a case that the slice type field has a second value. The type of the point cloud slice is a point cloud reflectivity attribute slice in a case that the slice type field has a third value. The type of the point cloud slice is a point cloud mixed attribute slice including a color attribute and a reflectivity attribute in a case that the slice type field has a fourth value.

For example, the slice type field having a value of 0 represents the point cloud geometry slice. The slice type field having a value of 1 represents the point cloud color attribute slice. The slice type field having a value of 2 represents the point cloud reflectivity attribute slice. The slice type field having a value of 3 represents the point cloud mixed attribute slice (namely, a point cloud attribute slice containing color and reflectivity).

By providing number fields and indication information fields related to component headers or point cloud slices, the electronic device may indicate component data of a point cloud sample based on the values of the fields, and thus may selectively partially decode the component headers or the point cloud slices, thereby further improving the decoding flexibility and decoding efficiency of point cloud media, and further reducing the cost consumption of computing resources.

In one embodiment of this disclosure, the point cloud slice includes a slice header and data information. The media file data box of the point cloud sample further includes a geometry slice header length field, a geometry slice data length field, an attribute slice header length field, an attribute slice data length, a geometry slice header field, a geometry slice data field, an attribute slice header, and an attribute slice data field.

The geometry slice header length field indicates a length of the slice header in a case that the point cloud slice is the geometry slice.

The geometry slice data length field indicates a length of the data information in a case that the point cloud slice is the geometry slice;

The attribute slice header length field indicates the length of the slice header in a case that the point cloud slice is the attribute slice.

The attribute slice data length field indicates the length of the data information in a case that the point cloud slice is the attribute slice.

The geometry slice header field indicates a point cloud slice header in a case that the point cloud slice is the geometry slice.

The geometry slice data field indicates the data information in a case that the point cloud slice is the geometry slice.

The attribute slice header field indicates the point cloud slice header in a case that the point cloud slice is the attribute slice.

The attribute slice data field indicates the data information in a case that the point cloud slice is the attribute slice.

FIG. 9 shows a syntax structure of a point cloud sample providing specific indication information of a point cloud slice in one embodiment of this disclosure.

When the type of the point cloud slice is the geometry slice, a geometry slice header length field geo slice header length and a geometry slice data length field geo slice data length shown in FIG. 10 may be used for indicating a length of a geometry slice header and a length of geometry information, respectively, while a geometry slice header field geo slice header and a geometry slice data field geo slice data shown in FIG. 10 may be used for indicating data of the geometry slice header and the geometry information, respectively.

When the type of the point cloud slice is the attribute slice, an attribute slice header length field attr_slice_ header_length and an attribute slice data length field attr_slice_data_length shown in FIG. 10 may be used for indicating a length of an attribute slice header and a length of attribute information, respectively, while an attribute slice header field attr_slice_header and an attribute slice data field attr_slice_data shown in FIG. 10 may be used for indicating data of the attribute slice header and the attribute information, respectively.

In one embodiment of this disclosure, sub-samples may be further divided within a point cloud frame sample, so as to achieve the purpose of partial access. When the point cloud sample includes one or more sub-samples, a media file data box of the sub-sample may include a sub-sample flag field, which is a flag bit for indicating a type of the sub-sample.

The sub-sample is a sub-sample based on a compression unit, namely, one sub-sample is composed of, or includes, at least one compression unit in the point cloud sample in a case that the sub-sample flag field has a value of 0.

The sub-sample is a tile-based sub-sample, namely, one sub-sample is composed of, or includes, a continuous unit sequence containing one or more compression units corresponding to a tile, or one sub-sample is composed of, or includes, a continuous unit sequence containing one or more compression units of each parameter set, tile inventory, or frame boundary marker, in a case that the sub-sample flag field has a value of 1.

In one embodiment of this disclosure, the media file data box of the sub-sample may include the following fields related to codec specific parameters codec specific parameters:

a geometry header flag field for indicating whether the sub-sample is a geometry header parameter set;
an attribute header flag field for indicating whether the sub-sample is an attribute header parameter set;
a geometry slice flag field for indicating whether the sub-sample is a point cloud geometry slice; and
an attribute slice flag field for indicating whether the sub-sample is a point cloud attribute slice.

In one embodiment of this disclosure, the media file data box of the sub-sample may further include an attribute type field for indicating a type of a point cloud attribute in a case that the sub-sample is the point cloud attribute slice.

In one embodiment of this disclosure, the type of the point cloud attribute is a color attribute in a case that the attribute type field has a first value.

The type of the point cloud attribute is a reflectivity attribute in a case that the attribute type field has a second value.

The type of the point cloud attribute is the color attribute and the reflectivity attribute in a case that the attribute type field has a third value.

FIG. 10 shows a syntax structure corresponding to specific parameters of a codec in a media file data box of a sub-sample according to one embodiment of this disclosure.

The sub-sample is a geometry header parameter set in a case that a geometry header flag field geo header flag has a value of 1. The sub-sample is not the geometry header parameter set in a case that the geometry header flag field geo header flag has a value of 0.

The sub-sample is an attribute header parameter set in a case that an attribute header flag field attr_header_flag has a value of 1. The sub-sample is not the attribute header parameter set in a case that the attribute header flag field attr_header_flag has a value of 0.

The sub-sample is a point cloud geometry slice in a case that a geometry slice flag field geo slice flag has a value of 1. The sub-sample is not the point cloud geometry slice in a case that the geometry slice flag field geo_slice_flag has a value of 0.

The sub-sample is a point cloud attribute slice in a case that an attribute slice flag field attr_slice_flag has a value of 1. The sub-sample is not the point cloud attribute slice in a case that the attribute slice flag field attr_slice_flag has a value of 0.

In this embodiment of this disclosure, the four flag bits of the geometry header flag field geo header flag, the attribute header flag field attr_header_flag, the geometry slice flag field geo_slice_flag, and the attribute slice flag field attr_slice_flag cannot be 0 at the same time.

An attribute type field attr_type indicates a type of a point cloud attribute in the point cloud attribute slice. The point cloud attribute slice only contains a color attribute in a case that the value is 0. The point cloud attribute slice only contains a reflectivity attribute in a case that the value is 1. The point cloud attribute slice contains both the color attribute and the reflectivity attribute in a case that the value is 2.

In one embodiment of this disclosure, different component information (geometry data and attribute data) in the point cloud media file may be encapsulated in different tracks based on a multi-track encapsulation mode. On this basis, related fields of the point cloud sample and the sub-samples thereof have corresponding value range constraints.

In one embodiment of this disclosure, the point cloud media file further includes a first point cloud sample encapsulated in a geometry track, and the geometry track is a track for encapsulating geometry data. The slice type field has a first value in a media file data box of the first point cloud sample, and the slice type field having the first value is used for representing that a type of a point cloud slice in the first point cloud sample is a point cloud geometry slice. A value range of the attribute slice flag field does not include a second value in a media file data box of a sub-sample of the first point cloud sample, and the attribute slice flag field having the second value is used for representing that the sub-sample is a point cloud attribute slice.

For example, for a track that only encapsulates geometry data, in the presence of a slice type field slice type in the point cloud sample, the field has only a value of 0. Also, the attribute slice flag field attr_slice_flag in the definition of the sub-sample is not allowed to have a value of 1.

In one embodiment of this disclosure, the point cloud media file further includes a second point cloud sample encapsulated in an attribute track, and the attribute track is a track for encapsulating attribute data. The header type field has a third value in a media file data box of the second point cloud sample, and the header type field having the third value is used for representing that the type of the parameter set is an attribute header. A value range of the slice type field does not include a first value in the media file data box of the second point cloud sample, and the slice type field having the first value is used for representing that the point cloud slice in the second point cloud sample is a point cloud geometry slice. A value range of the geometry header flag field does not include a second value in a media file data box of a sub-sample of the second point cloud sample, and the geometry header flag field having the second value is used for representing that the sub-sample is a geometry header parameter set. A value range of the geometry slice flag field does not include a second value in the media file data box of the sub-sample of the second point cloud sample, and the geometry slice flag field having the second value is used for representing that the sub-sample is a point cloud geometry slice.

For example, for a track that only encapsulates attribute data, in the presence of a header type field header_type in the point cloud sample, the field has only a value of 2. In the presence of a slice type field slice type in the sample, the value cannot be 0. Also, the geometry header flag field geo header flag and the geometry slice flag field geo_slice_flag in the definition of the sub-sample are not allowed to have a value of 1.

In one embodiment of this disclosure, the point cloud media file includes a point cloud sample encapsulated in a plurality of tracks, and a media file data box of the point cloud sample includes metadata information corresponding to the tracks. The metadata information includes: a component type field, an attribute number field, and an attribute type field.

The component type field indicates a component type of a point cloud sample encapsulated in the track, the component type including an attribute component for representing attribute data and a geometry component for representing geometry data.

The attribute number field indicates the number of attribute components encapsulated in the track.

The attribute type field indicates a type of the attribute component encapsulated in the track.

On this basis, different values of the attribute type field may be used for representing types of different attribute components. The type of the attribute component is a color attribute in a case that the attribute type field has a first value. The type of the attribute component is a reflectivity attribute in a case that the attribute type field has a second value.

FIG. 11 shows a syntax structure of metadata information indicating the number of attributes in a multi-track encapsulation mode in one embodiment of this disclosure.

A component type field gpcc_type indicates a type of a component in a track.

An attribute number field attr num indicates the number of attribute components contained in the track.

An attribute type field attr_type indicates the type of the attribute component contained in the track. The type of the component is a color attribute in a case that the value is 0. The type of the component is a reflectivity attribute in a case that the value is 1.

By indicating the number of attributes in metadata information, the type of each attribute component encapsulated in the track may be indicated by combining the attribute number field and the attribute type field.

Table 2 shows a semantic description of different values of component type fields in one embodiment of this disclosure.

TABLE 2

| gpcc_type value | Description |
| --- | --- |
| 1 | Reserved |
| 2 | Geometry Data |
| 3 | Reserved |
| 4 | Attribute Data |
| 5 . . . 31 | Reserved. |

As shown in Table 2, when the component type field gpcc_type has a value of 2, the point cloud component is a geometry component for representing geometry data. When the component type field gpcc_type has a value of 4, the point cloud component is an attribute component for representing attribute data. Other values (such as 1, 3, or 5-31) of the component type field gpcc_type are reserved.

In one embodiment of this disclosure, the point cloud media file includes a point cloud sample encapsulated in a plurality of tracks, and a media file data box of the point cloud sample includes metadata information corresponding to the tracks. The metadata information includes: a component type field and an attribute type field.

The component type field indicates a component type of a point cloud sample encapsulated in the track, the component type including an attribute component for representing attribute data and a geometry component for representing geometry data.

The attribute type field indicates a type of the attribute component encapsulated in the track.

On this basis, different values of the attribute type field may be used for representing types of different attribute components. The type of the attribute component is a color attribute in a case that the attribute type field has a first value. The type of the attribute component is a reflectivity attribute in a case that the attribute type field has a second value. The type of the attribute component includes both the color attribute and the reflectivity attribute in a case that the attribute type field has a third value.

FIG. 12 shows a syntax structure of metadata information of an extended attribute type in a multi-track encapsulation mode in one embodiment of this disclosure.

A component type field gpcc_type indicates a type of a component in a track.

An attribute type field attr type indicates the type of the attribute component contained in the track. The type of the component is a color attribute in a case that the value is 0. The type of the component is a reflectivity attribute in a case that the value is 1. The type of the component contains both the color attribute and the reflectivity attribute in a case that the value is 2.

By extending the value range of attribute type fields in metadata information, the type of each attribute component encapsulated in a track may be indicated separately using the attribute type fields.

In one embodiment of this disclosure, a data source may transmit a streaming media transmission signaling corresponding to a point cloud media file to a data receiver. The data receiver parses the streaming media transmission signaling transmitted by the data source to obtain a component descriptor carried in the streaming media transmission signaling. The component descriptor is used for indicating type information and attribute information of a point cloud component encapsulated in a track. A point cloud media file transmitted by the data source is obtained according to the component descriptor. The data receiver here may be an electronic device which needs to receive the point cloud media file, such as a terminal. After receiving the point cloud media file, the terminal may decode the point cloud media file and may obtain point cloud data.

The streaming media transmission signaling is a message transmitted between the data source and the data receiver for coordinating a communication process, and may be, for example, a DASH signaling based on a DASH protocol, or may also be an SMT signaling.

In a single-track encapsulation mode, the DASH signaling includes an adaptation set having one or more representations. Each representation represents an independent point cloud bytestream. If one representation is composed of, or includes, a plurality of media segments, an initialization media segment is also included in the DASH signaling.

The initialization media segment contains a GPCC decoder configuration record GPCCDecoderConfigurationRecord with a G-PCC parameter set, such as an SPS, a GPS, and an APS as defined in the standard ISO/IEC 23090-9 for example.

In a multi-track encapsulation mode, each G-PCC component in the DASH signaling is represented as a separate adaptation set, which may be referred to as a component adaptation set. The adaptation set containing geometry information is a main GPCC adaptation set that acts as a G-PCC content access point. The main GPCC adaptation set contains a single initialization segment at an adaptation set level or a plurality of initialization segments at a representation level (each representation corresponds to one initialization segment). The initialization segment is required to contain specified G-PCC parameter sets. The parameter sets are necessary to initialize a G-PCC decoder.

At the adaptation set level, a component descriptor GPCCComponent descriptor is required to transmit a signal for each point cloud component present in the representation of the adaptation set.

In one embodiment of this disclosure, the component descriptor includes a component type field, a component attribute number field, and a component attribute type field.

The component type field component@type indicates that the type of the point cloud component is a geometry component or an attribute component.

The component attribute number field component@attr_num indicates the number of attribute components.

The component attribute type field component@attr_type indicates the type of the attribute component.

Table 3 shows a semantic interpretation of component descriptors in one embodiment of this disclosure.

may be provided to a data receiver. Therefore, the transmission and decoding efficiency of point cloud media can be improved, and the cost consumption of bandwidth resources and computing resources can be reduced.

FIG. 13 shows a flowchart of steps of a method for encoding point cloud media in one embodiment of this disclosure. The method may be applied to links such as a server, a terminal (or a client running on the terminal), and an intermediate node of a point cloud media system. This embodiment of this disclosure describes an example in which an electronic device installed with an apparatus for encoding point cloud media performs the method for encoding point cloud media. As shown in FIG. 13, the method for encoding point cloud media includes step S1310 to step S1330 as follows.

In step S1310, point cloud source data is obtained, the point cloud source data including a plurality of point cloud frames.

The point cloud source data includes point cloud videos (images and/or videos) representing objects and/or environments located in various 3D spaces (for example, 3D spaces representing real environments, 3D spaces representing virtual environments, and the like).

In one embodiment of this disclosure, a data source may capture point cloud source data using acquisition devices such as one or more cameras (for example, infrared cameras capable of protecting depth information, RGB cameras capable of extracting color information corresponding to the depth information, and the like), projectors (for example, infrared pattern projectors for protecting the depth information), and LiDAR. A shape of a geometry structure composed of, or including, points in a 3D space may be extracted from the depth information of the point cloud source data,

TABLE 3

| Elements and Attributes for GPCC Component descriptor | Use | Data type | Description |
|---|---|---|---|
| component | 0 . . . N | gpcc:gpccComponentType | An element, having attributes specifying information of one of geometry point cloud components present in a representation of an adaptation set |
| component@type | M | xs:string | Indicating a type of a point cloud component, a "geom" value represents a G-PCC geometry component, and an "attr" value represents a G-PCC attribute component |
| component@attr_num | CM | xs:unsignedByte | Indicating the number of attribute components contained in the corresponding representation |
| component@attr_type | CM | xs:unsignedByte Vector | An array indicating the type of attribute components contained in the corresponding representation, and the number of attribute types in the array depends on the value of an attr_num field |

For an attribute field Attributes:
M = Mandatory, representing a mandatory field; O = Optional, representing an optional field; OD = Optional with Default Value, representing an optional field a default value; CM = Conditionally Mandatory, representing a conditional mandatory field.
For an element field Elements:
<minOccurs> . . . <maxOccurs>, representing a value range, where N represents unbounded.
The element field Elements is represented in bold; and the attribute field Attributes is represented in non-bold and begins with @.

In a streaming media transmission signaling, information such as a component type, a component attribute number, and a component attribute type of a point cloud component carried in a point cloud media file is indicated by a component descriptor, and indication information for partially receiving or partially decoding the point cloud media file and an attribute of each point may be extracted from the color information of the point cloud source data to protect the point cloud source data.

Point cloud video data is taken as an example. A point cloud video may include one or more point cloud frames, and one point cloud frame may represent a frame of point cloud image. In one embodiment of this disclosure, the point cloud video data may be captured based on at least one of an inward facing technology and an outward facing technology.

The inward facing technology refers to a technology of capturing an image of a central object with one or more cameras (or camera sensors) disposed around the central object. Point cloud content that provides a 360-degree image of a key object to a user may be generated using the inward facing technology (for example, VR/AR content that provides a 360-degree image of an object (for example, a key object such as a character, a player, an object, or an actor) to the user).

The outward facing technology refers to a technology of capturing an environment of a central object instead of an image of the central object with one or more cameras (or camera sensors) disposed around the central object. The outward facing technology may be used for generating point cloud content for providing a surrounding environment that appears from the perspective of a user (for example, content representing an external environment that may be provided to a user of a self-driven vehicle).

When the point cloud content is generated based on a capture operation of one or more cameras, a coordinate system is different in each camera. Therefore, the data source may calibrate the one or more cameras to set a global coordinate system prior to the capture operation. In addition, the data source may generate the point cloud content by compositing any image and/or video with the image and/or video captured by the foregoing capture technology. The data source may perform post-processing on the captured image and/or video, for example, may remove unnecessary regions (for example, background), identify spaces to which the captured image and/or video is connected, and perform operations to fill spatial holes in the presence of the spatial holes, and the like.

The data source may generate point cloud content by performing coordinate transformation on points of the point cloud video protected by each camera. The data source may perform coordinate transformation on the points based on the coordinates of each camera position. Therefore, the data source may generate point cloud content representing a wide spatial extent, or may generate point cloud content having a high density of points.

In step S1320, the point cloud frames are encoded to obtain at least one compression unit.

In step S1330, the at least one compression unit is encapsulated to obtain a point cloud media file, the point cloud media file including point cloud samples encapsulated in one or more tracks. A media file data box of the point cloud sample includes a type field for indicating a type of the compression unit. The type of the compression unit includes any one of a geometry header for indicating a parameter set of geometry information, an attribute header for indicating a parameter set of attribute information, a geometry slice serving as point cloud slice data for indicating the geometry information, and an attribute slice serving as point cloud slice data for indicating the attribute information.

The point cloud media file may be a media file or a media segment obtained after encoding and encapsulation processing as shown in FIG. 2. The media file or the media segment carries a point cloud bytestream to be transmitted.

In one embodiment of this disclosure, a data source may encapsulate the point cloud bytestream into a single track according to geometry parameter information, attribute parameter information, and parameter information of a point cloud slice contained in the point cloud bytestream, or may also re-encapsulate the point cloud media file of the single track into a point cloud media file containing a plurality of tracks.

The track may be a volumetric visual track for carrying an encoded geometry bitstream or an encoded attribute bitstream, or may be a volumetric visual track carrying both the encoded geometry bitstream and the encoded attribute bitstream.

In a case that point cloud bytestreams are encapsulated in a single track, each point cloud sample may correspond to a complete point cloud frame.

The media file data box may be an ISOBMFF-based data box. For example of the ISOBMFF, refer may be made to the standard ISO/IEC 14496-12.

When a G-PCC bytestream is carried in the single track, a simple ISOBMFF encapsulation may be utilized without further processing by storing the G-PCC bytestream in the single track.

In a single-track encapsulation mode, one point cloud sample may include one or more compression units encapsulated based on a TLV format, which may include, for example, a parameter set TLV, a geometry TLV, and an attribute TLV in FIG. 5.

A TLV bytestream format, namely a type-length-value bytestream format, refers to a structure composed of, or including, a type of data, a length of data, and a value of data. For an example of the TLV bytestream format, reference may be made to the standard ISO/IEC 23090-9.

In a multi-track encapsulation mode, bytestream data of each point cloud component is mapped into a separate track. A G-PCC component track is available in two types: a G-PCC geometry track and a G-PCC attribute track. Each point cloud sample in the track contains at least one G-PCC unit, which carries a single G-PCC component data unit instead of multiplexing of geometry and attribute data units or different attribute data units. The G-PCC attribute track is not required to multiplex different attribute sub-streams, such as color and reflectivity. A data structure obtained by encapsulating a geometry bytestream and an attribute bytestream in a plurality of tracks may refer to FIG. 6. ftyp represents a file type and describes a version of a specification to which a point cloud sample complies; moov box represents metadata of a point cloud sample; and mdat represents specific media data carried in the point cloud sample.

In one embodiment of this disclosure, according to geometry information and attribute information of encoded point cloud source data, field assignment may be performed on a media file data box of a point cloud sample. The assignment basis may refer to the syntax structure of the compression unit encapsulated based on the TLV format shown in FIG. 7 and the semantic description of different values of compression unit type fields shown in Table 1.

Corresponding type fields may be filled with different values for different types of compression units. Table 1 is taken as an example.

When the type of the compression unit is an SPS, the corresponding type field may be filled with a value of 0.

When the type of the compression unit is a GPS, the corresponding type field may be filled with a value of 1.

When the type of the compression unit is a geometry data unit, the corresponding type field may be filled with a value of 2.

When the type of the compression unit is an APS, the corresponding type field may be filled with a value of 3.

When the type of the compression unit is an attribute data unit, the corresponding type field may be filled with a value of 4.

When the type of the compression unit is a tile inventory, the corresponding type field may be filled with a value of 5.

When the type of the compression unit is a frame boundary marker, the corresponding type field may be filled with a value of 6.

For examples of the above types of the compression unit, reference may be made to the standard ISO/IEC 23090-9.

In order to provide indication information of more specific point cloud components to enable more flexible transmission and decoding of point cloud media files according to actual point cloud consumption requirements, this embodiment of this disclosure may also assign values to the following compression unit type fields according to the semantic description.

When the type of the compression unit is a geometry header, the corresponding type field may be filled with a value of 7, and the geometry header is used for indicating a parameter set of geometry information.

When the type of the compression unit is an attribute header, the corresponding type field may be filled with a value of 8, and the attribute header is used for indicating a parameter set of attribute information.

When the type of the compression unit is a geometry slice, the corresponding type field may be filled with a value of 9, and the geometry slice is used for indicating point cloud slice data of geometry information.

When the type of the compression unit is an attribute slice, the corresponding type field may be filled with a value of 10, and the attribute slice is used for indicating point cloud slice data of attribute information.

In this embodiment of this disclosure, the G-PCC unit includes any one of a geometry header, an attribute header, a geometry slice, and an attribute slice. The G-PCC unit in the same point cloud sample corresponds to the same point cloud frame and has the same presentation time.

By providing a type field of a compression unit in a media file data box, different field values may be used for indicating that the compression unit to be decoded is a geometry header, an attribute header, a geometry slice, or an attribute slice, whereby partial file content may be selectively decoded according to the consumption requirements of point cloud media without decoding the whole file content. Therefore, not only the flexibility of point cloud data consumption can be improved, but also the decoding efficiency of the point cloud data can be significantly improved and the cost consumption of computing resources can be reduced.

Figure 14:
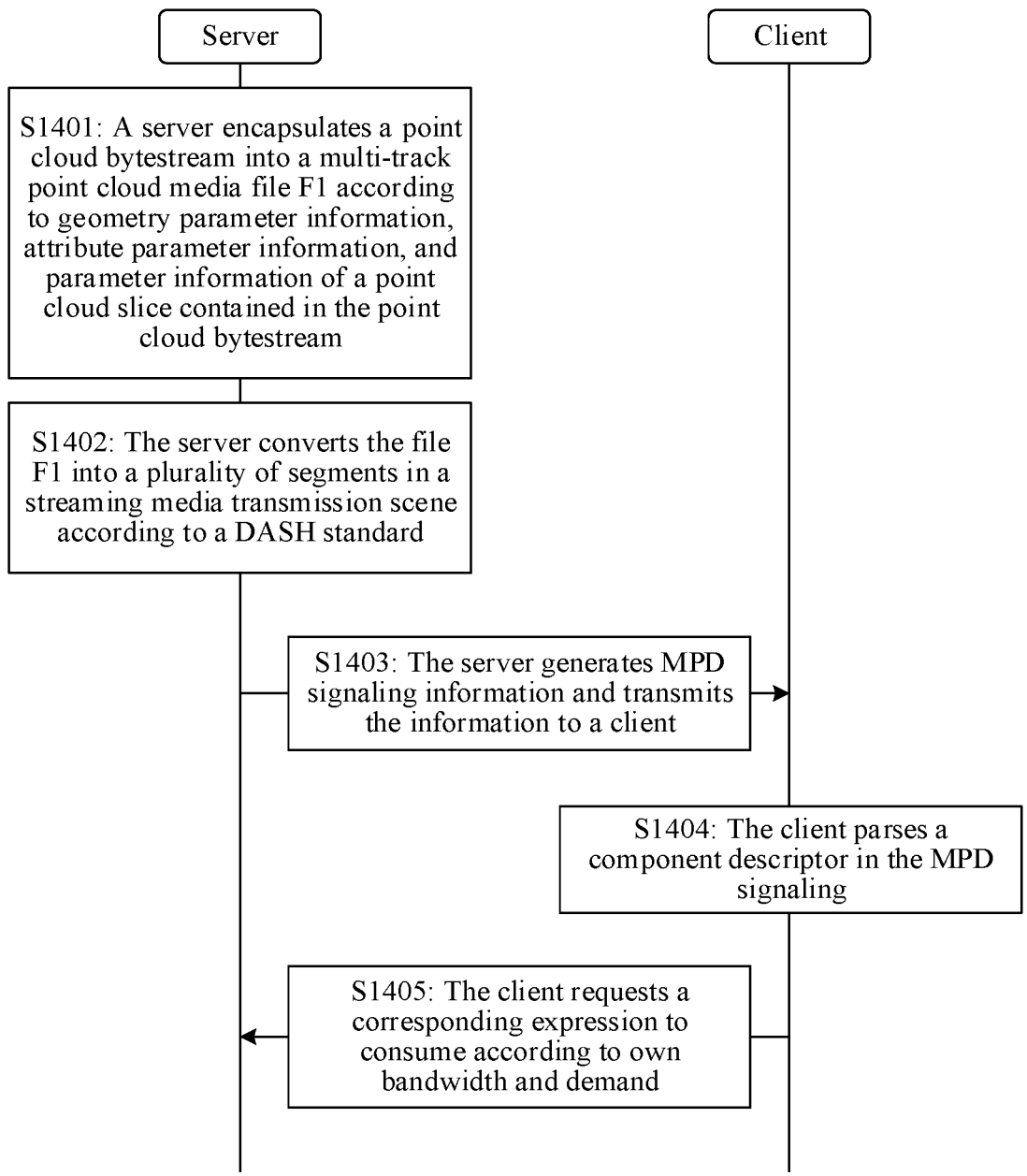
FIG. 14 shows a flowchart of point cloud data encoding and decoding in a multi-track encapsulated streaming media transmission application scene according to an embodiment of this disclosure.

FIG. 14 shows a flowchart of point cloud data encoding and decoding in a multi-track encapsulated streaming media transmission application scene according to an embodiment of this disclosure. As shown in FIG. 14, as a data source for producing a point cloud media file, a server may encode and transmit point cloud data to a client (or a terminal running the client) where a user is located, and the point cloud data may be obtained for the user to consume after decoding the point cloud media file by the client. Specific processes of encoding and decoding point cloud data may include the following steps:

In step S1401, a server encapsulates a point cloud bytestream into a multi-track point cloud media file F1 according to geometry parameter information, attribute parameter information, and parameter information of a point cloud slice contained in the point cloud bytestream.

The point cloud media file F1 may include, for example, three tracks: Track1, Track2, and Track3.

In a media file data box GPCCComponentInfoBox of Track1, gpcc_type=2. A point cloud component representing the encapsulation within the track is a geometry component for representing geometry data.

In a media file data box GPCCComponentInfoBox of Track2, gpcc_type=4, attr_num=1, and attr_type=0. A point cloud component representing the encapsulation within the track is an attribute component for representing attribute data, and only one attribute component is contained in the track. An attribute type of the attribute component is a color attribute.

In a media file data box GPCCComponentInfoBox of Track2, gpcc_type=4; attr_num=1; and attr_type=1. A point cloud component representing the encapsulation within the track is an attribute component for representing attribute data, and only one attribute component is contained in the track. An attribute type of the attribute component is a reflectivity attribute.

In step S1402, the server converts the file F1 into a plurality of segments in a streaming media transmission scene according to a DASH standard.

In step S1403, the server generates MPD signaling information and transmits the information to a client.

In step S1404, the client parses a component descriptor in the MPD signaling.

The component descriptor includes an attribute number field attr_num and an attribute type field attr_type, and the number of attribute components contained in a representation and the corresponding type may be determined based on a field value of the component descriptor.

In step S1405, the client requests a corresponding expression to consume according to own bandwidth and demand.

Based on the value of the component descriptor, different point cloud data may be selectively requested from the server to be transmitted, so as to avoid full transmission and full decoding of the point cloud media file, thereby improving data transmission efficiency and decoding efficiency, and reducing the consumption of bandwidth resources and computing resources. For example, client 1 may request geometry data and color attribute data for consumption, and client 2 may request geometry data, color, and reflectivity attribute data for consumption.

Figure 15:
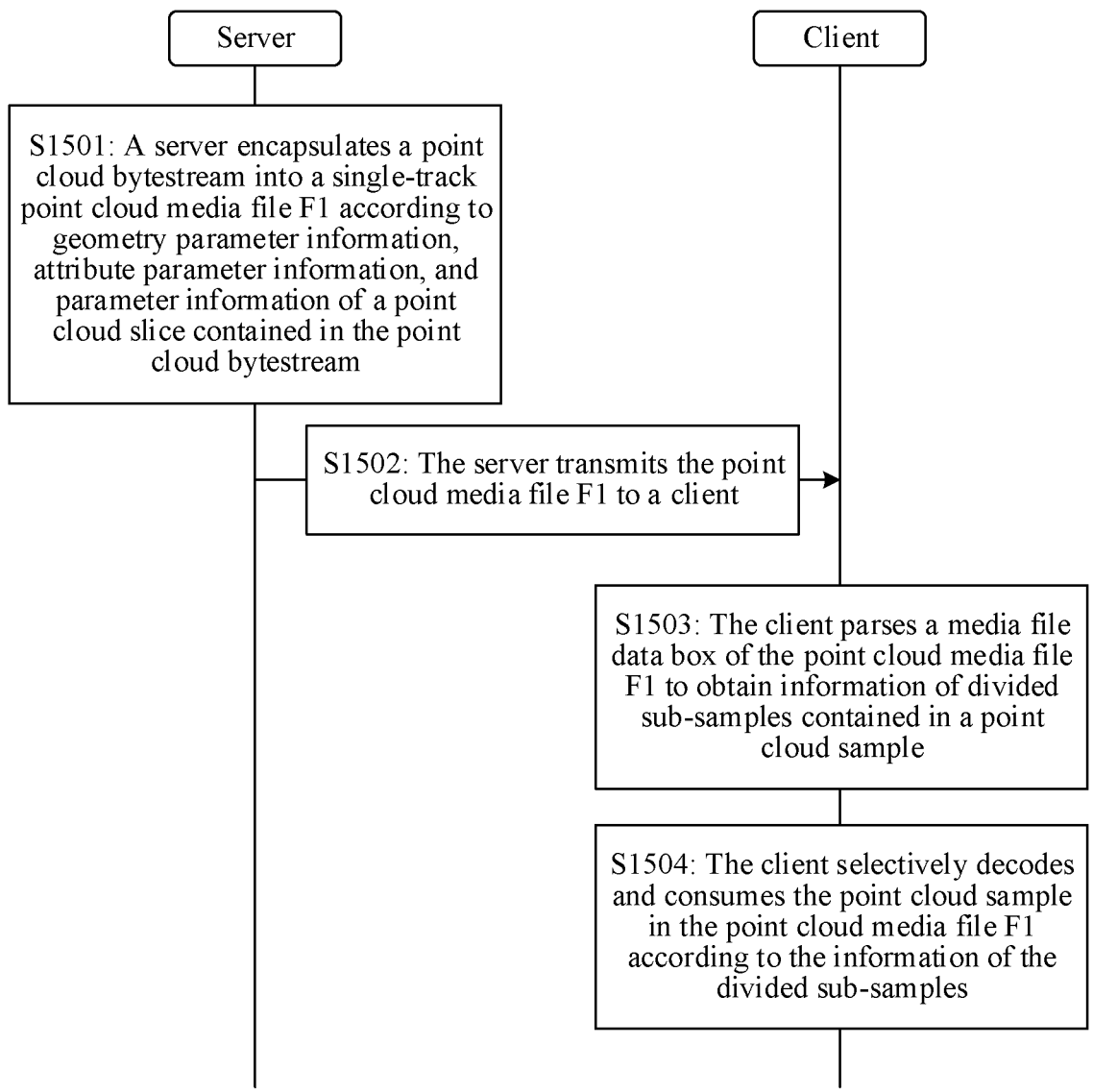
FIG. 15 shows a flowchart of point cloud data encoding and decoding in a single-track encapsulated local point cloud media playing application scene according to an embodiment of this disclosure.

FIG. 15 shows a flowchart of point cloud data encoding and decoding in a single-track encapsulated local point cloud media playing application scene according to an embodiment of this disclosure. As shown in FIG. 15, as a data source for producing a point cloud media file, a server may encode and transmit point cloud data to a client where a user is located, and the point cloud data may be obtained for the user to consume after decoding the point cloud media file by the client. Specific processes of encoding and decoding point cloud data may include the following steps:

In step S1501, a server encapsulates a point cloud bytestream into a single-track point cloud media file F1 according to geometry parameter information, attribute parameter information, and parameter information of a point cloud slice contained in the point cloud bytestream.

Sub-samples of a point cloud sample may be divided in the point cloud media file F1, so as to achieve the purpose of partial access. The sub-sample is a sub-sample based on a compression unit, namely, one sub-sample is composed of, or includes, at least one compression unit in the point cloud sample.

When the point cloud sample includes one or more sub-samples, a media file data box of the sub-sample may include a sub-sample flag field, which is a flag bit for indicating a type of the sub-sample. The sub-sample is a sub-sample based on a compression unit, namely, one sub-sample is composed of, or includes, at least one compression unit in the point cloud sample in a case that the sub-sample flag field has a value of 0.

The media file data box of the sub-sample may include the following fields related to codec specific parameters codec_specific_parameters:
- a geometry header flag field for indicating whether the sub-sample is a geometry header parameter set;
- an attribute header flag field for indicating whether the sub-sample is an attribute header parameter set;
- a geometry slice flag field for indicating whether the sub-sample is a point cloud geometry slice;
- an attribute slice flag field for indicating whether the sub-sample is a point cloud attribute slice; and
- an attribute type field for indicating a type of a point cloud attribute in a case that the sub-sample is the point cloud attribute slice.

The sub-sample is a geometry header parameter set in a case that a geometry header flag field geo_header_flag has a value of 1. The sub-sample is not the geometry header parameter set in a case that the geometry header flag field geo_header_flag has a value of 0.

The sub-sample is an attribute header parameter set in a case that an attribute header flag field attr_header_flag has a value of 1. The sub-sample is not the attribute header parameter set in a case that the attribute header flag field attr_header_flag has a value of 0.

The sub-sample is a point cloud geometry slice in a case that a geometry slice flag field geo_slice_flag has a value of 1. The sub-sample is not the point cloud geometry slice in a case that the geometry slice flag field geo_slice_flag has a value of 0.

The sub-sample is a point cloud attribute slice in a case that an attribute slice flag field attr_slice_flag has a value of 1. The sub-sample is not the point cloud attribute slice in a case that the attribute slice flag field attr_slice_flag has a value of 0.

The four flag bits of the geometry header flag field geo_header_flag, the attribute header flag field attr_header_flag, the geometry slice flag field geo_slice_flag, and the attribute slice flag field attr_slice_flag cannot be 0 at the same time.

An attribute type field attr_type indicates a type of a point cloud attribute in the point cloud attribute slice. The point cloud attribute slice only contains a color attribute in a case that the value is 0. The point cloud attribute slice only contains a reflectivity attribute in a case that the value is 1. The point cloud attribute slice contains both the color attribute and the reflectivity attribute in a case that the value is 2.

In step S1502, the server transmits the point cloud media file F1 to a client.

In step S1503, the client parses a media file data box of the point cloud media file F1 to obtain information of divided sub-samples contained in a point cloud sample.

In step S1504, the client selectively decodes and consumes the point cloud sample in the point cloud media file F1 according to the information of the divided sub-samples.

Based on information such as a geometry header flag field geo_header_flag, an attribute header flag field attr_header_flag, a geometry slice flag field geo_slice_flag, an attribute slice flag field attr_slice_flag, and an attribute type field attr_type in a media file data box, a data type contained in a compression unit corresponding to the sub-sample may be determined. Therefore, the point cloud sample may be selectively decoded and consumed according to the demands thereof in combination with the information of the divided sub-samples contained in the sample (a sub-sample tool may divide a sample into different data blocks, in combination with the definition in the present disclosure). For example, client 1 may partially decode geometry data and color attribute data for consumption. Client 2 may completely decode the geometry data, the color attribute data, and reflectivity attribute data for consumption.

In this embodiment of this disclosure, by performing field extension at a file encapsulation level and a transmission signaling level, component information in a track sample and a sub-sample in a single-track encapsulation mode, component information in a track sample and a sub-sample in a multi-track encapsulation mode, and component indication information in a track in the multi-track encapsulation mode may be defined in a media file data box, whereby a client may transmit, decapsulate, and decode required point cloud data according to a component type, thereby achieving the purposes of partial access and partial transmission, improving the transmission efficiency and decoding efficiency of point cloud data, and achieving the maximum saving of bandwidth and computing resources.

Although the steps of the methods in this disclosure are described in the drawings in a particular order, it is not required or implied that the steps are performed in the particular order or that all illustrated steps are performed to achieve desired results. Additionally or alternatively, some steps may be omitted, a plurality of steps may be combined into one step for execution, and/or one step may be decomposed into a plurality of steps for execution, and the like.

The following describes apparatus embodiments of this disclosure that may be used to perform the methods for encoding and decoding point cloud media according to the foregoing embodiments of this disclosure.

Figure 16:
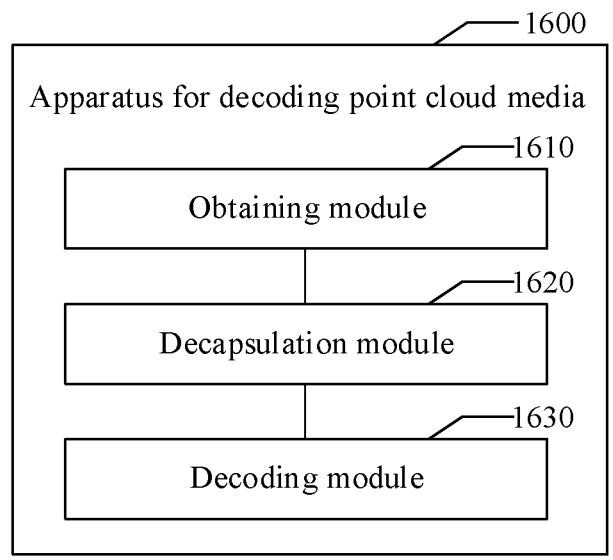
FIG. 16 schematically shows a structural block diagram of a point cloud decoding apparatus according to an embodiment of this disclosure.

FIG. 16 schematically shows a structural block diagram of an apparatus for decoding point cloud media according to an embodiment of this disclosure. As shown in FIG. 16, an apparatus 1600 for decoding point cloud media may include an obtaining module 1610, a decapsulation module 1620, and a decoding module 1630.

The obtaining module 1610 is configured to obtain a point cloud media file, the point cloud media file including point cloud samples encapsulated in one or more tracks.

The decapsulation module 1620 is configured to decapsulate the point cloud samples to obtain at least one compression unit, a media file data box of the point cloud sample including a type field for indicating a type of the compression unit, the type of the compression unit including any one of a geometry header for indicating a parameter set of geometry information, an attribute header for indicating a parameter set of attribute information, a geometry slice serving as point cloud slice data for indicating the geometry information, and an attribute slice serving as point cloud slice data for indicating the attribute information.

The decoding module 1630 is configured to select a target compression unit according to the type field, and decode the target compression unit to obtain point cloud data.

Figure 17:
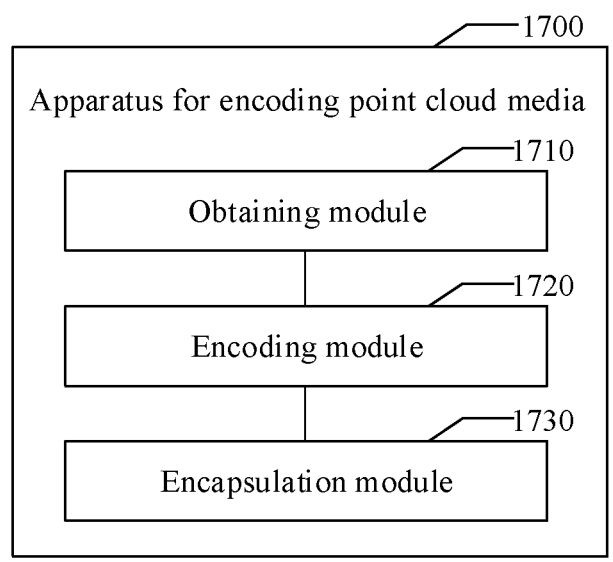
FIG. 17 schematically shows a structural block diagram of a point cloud encoding apparatus according to an embodiment of this disclosure.

FIG. 17 schematically shows a structural block diagram of an apparatus for encoding point cloud media according to an embodiment of this disclosure. As shown in FIG. 17, an apparatus 1700 for encoding point cloud media may include: an obtaining module 1710, an encoding module 1720, and an encapsulation module 1730.

The obtaining module 1710 is configured to obtain point cloud source data, the point cloud source data including a plurality of point cloud frames.

The encoding module 1720 is configured to encode the point cloud frames to obtain at least one compression unit.

The encapsulation module 1730 is configured to encapsulate the at least one compression unit to obtain a point cloud media file, the point cloud media file including point cloud samples encapsulated in one or more tracks, a media file data box of the point cloud sample including a type field for indicating a type of the compression unit, the type of the compression unit including any one of a geometry header for indicating a parameter set of geometry information, an attribute header for indicating a parameter set of attribute information, a geometry slice serving as point cloud slice data for indicating the geometry information, and an attribute slice serving as point cloud slice data for indicating the attribute information.

For exemplary details and beneficial effects of the apparatus for encoding point cloud media and the apparatus for decoding point cloud media provided in the various embodiments of this disclosure, reference may be made to the corresponding method embodiments.

Figure 18:
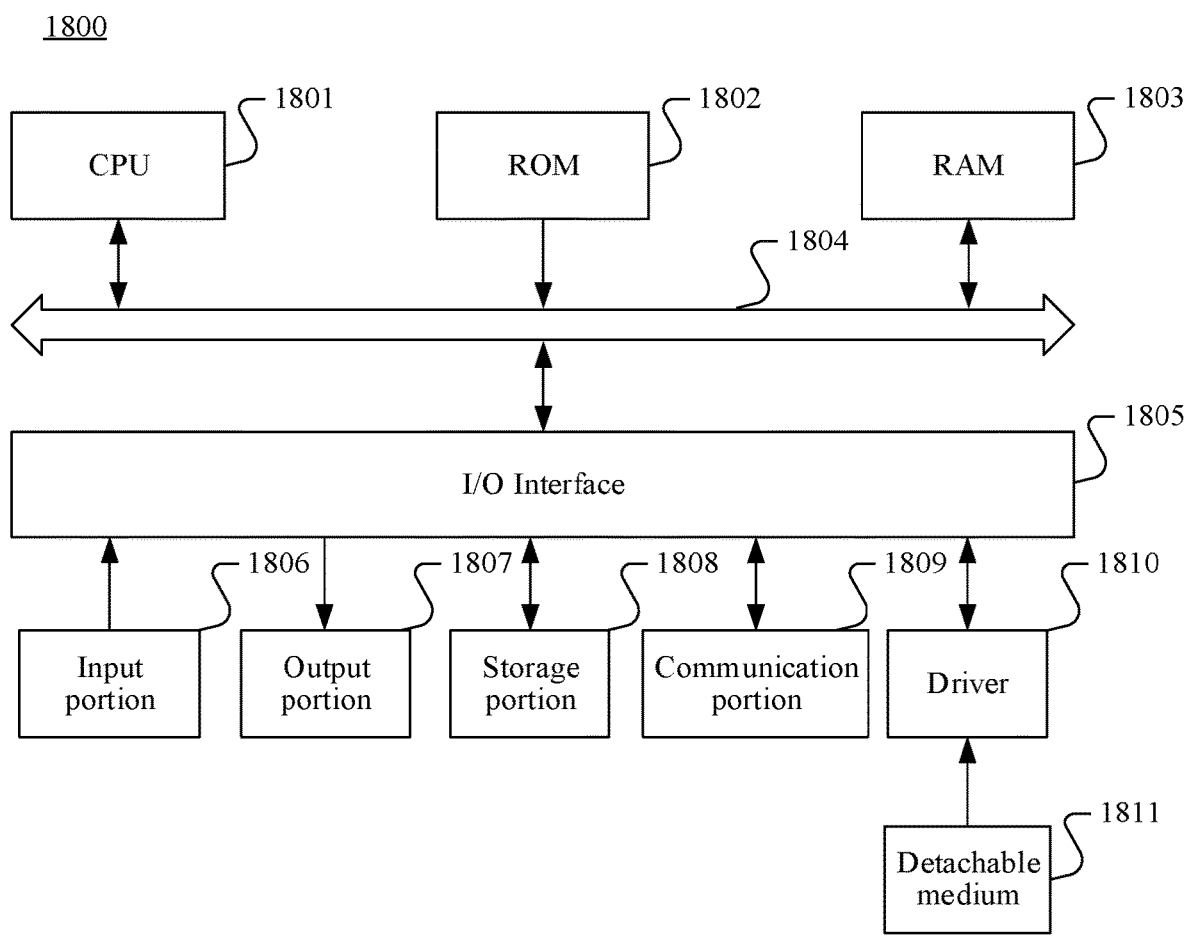
FIG. 18 schematically shows a structural block diagram of a system of an electronic device suitable for implementing an embodiment of this disclosure.

FIG. 18 schematically shows a structural block diagram of a system of an electronic device for implementing an embodiment of this disclosure.

It is to be noted that a system 1800 of an electronic device shown in FIG. 18 is merely an example and may not pose any limitation on the scope of functionality or use of the embodiments of this disclosure.

As shown in FIG. 18, the system 1800 includes processing circuitry, such as a central processing unit (CPU) 1801, which may perform various suitable actions and processing based on a program stored in a read-only memory (ROM) 1802 or a program loaded from a storage portion 1808 into a random access memory (RAM) 1803. In the RAM 1803, various programs and data required for system operation are also stored. The CPU 1801, the ROM 1802, and the RAM 1803 are connected to each other via a bus 1804. An input/output (I/O) interface 1805 is also connected to the bus 1804.

The following components are connected to the I/O interface 1805: an input portion 1806 including a keyboard, a mouse, and the like; an output portion 1807 including, for example, a cathode ray tube (CRT), a liquid crystal display (LCD), a loudspeaker, and the like; a storage portion 1808 including a hard disk, and the like; and a communication portion 1809 including, for example, a network interface card such as a local area network card and a modem. The communication portion 1809 performs communication processing via a network such as the Internet. A driver 1810 is also connected to the I/O interface 1805 as required. A detachable medium 1811, such as a magnetic disk, an optical disk, a magneto-optical disk, or a semiconductor memory, is installed on the driver 1810 as required, whereby computer-readable instructions read therefrom are installed into the storage portion 1808 as required.

According to the embodiments of this disclosure, the processes described in the various method flowcharts may be implemented as computer software programs. For example, the embodiments of this disclosure include a computer program product. The computer program product includes computer-readable instructions stored on a computer-readable medium, such as a non-transitory computer-readable storage medium. The computer-readable instructions include program code used for performing the methods shown in the flowchart. In such embodiments, the computer-readable instructions may be downloaded and installed over the network through the communication portion 1809, and/or installed from the detachable medium 1811. When the computer-readable instructions are executed by the CPU 1801, the various functions defined in the system of this disclosure are executed.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

After considering the specification and practicing the present disclosure, other implementations of this disclosure should become apparent. This disclosure is intended to cover other variations, uses, or adaptive changes of this disclosure.

It is to be understood that this disclosure is not limited to the precise structures described above and shown in the accompanying drawings, and various modifications and changes may be made without departing from the scope of this disclosure.

What is claimed is:

1. A method for decoding point cloud media, the method comprising:
    receiving point cloud media data, the point cloud media data including a plurality of point cloud samples encapsulated in one or more tracks;
    obtaining at least a compression unit of a point cloud sample in the plurality of point cloud samples, a media file data box of the point cloud sample including type information that indicates a type of the compression unit, the type of the compression unit being one of a geometry header indicating a parameter set of geometry information, an attribute header indicating a parameter set of attribute information, a geometry slice indicating point cloud slice data of the geometry information, and an attribute slice indicating point cloud slice data of the attribute information, wherein
    when one of the one or more tracks is a geometry track for encapsulating geometry data,
        slice type information indicates a first value in the media file data box of the point cloud sample, and the first value of the slice type information indicates that a type of the point cloud slice data in the point cloud sample is a point cloud geometry slice, and
        attribute slice flag information does not include a second value in a media file data box of a sub-sample of the point cloud sample, and the attribute slice flag information indicating the second value indicates that the sub-sample is a point cloud attribute slice;
    determining whether the compression unit is to be decoded according to the type information; and decoding the compression unit to obtain point cloud data based on the compression unit being determined to be decoded.

2. The method according to claim 1, wherein the media file data box of the point cloud sample further comprises:
component header number information indicating a number of parameter sets in the point cloud sample; and
slice number information indicating a number of point cloud slices in the point cloud sample.

3. The method according to claim 2, wherein a parameter set of the point cloud sample is included in decoder configuration information when the component header number information has a value of 0.

4. The method according to claim 2, wherein the media file data box of the point cloud sample further comprises:
header type information indicating that a type of a parameter set of the point cloud sample is a geometry header or an attribute header;
header length information indicating a length of the parameter set; and
header data information indicating data in the parameter set.

5. The method according to claim 2, wherein the media file data box of the point cloud sample further comprises:
slice length information indicating a length of the point cloud slice data; and
slice data information including the point cloud slice data.

6. The method according to claim 5, wherein
the type of the point cloud slice data is a point cloud reflectivity attribute slice when the slice type information indicates a third value; and
the type of the point cloud slice data is a point cloud mixed attribute slice including a color attribute and a reflectivity attribute when the slice type information indicates a fourth value.

7. The method according to claim 2, wherein
the point cloud slice data includes a slice header and data information; and
the media file data box of the point cloud sample includes:
geometry slice header length information indicating a length of the slice header when the point cloud slice data corresponds to the geometry slice;
geometry slice data length information indicating a length of the data information when the point cloud slice data corresponds to the geometry slice;
attribute slice header length information indicating the length of the slice header when the point cloud slice data corresponds to the attribute slice;
attribute slice data length information indicating the length of the data information when the point cloud slice data corresponds to the attribute slice;
geometry slice header information indicating a point cloud slice header when the point cloud slice data corresponds to the geometry slice;
geometry slice data information including the data information when the point cloud slice data corresponds to the geometry slice;
attribute slice header information indicating the point cloud slice header when the point cloud slice data corresponds to the attribute slice; and
attribute slice data information including the data information when the point cloud slice data corresponds to the attribute slice.

8. The method according to claim 1, wherein
the point cloud sample includes at least a sub-sample,
a media file data box of the sub-sample includes sub-sample flag information, and
the sub-sample includes the compression unit in the point cloud sample when the sub-sample flag information indicates a value of 0.

9. The method according to claim 8, wherein the media file data box of the sub-sample further comprises:
geometry header flag information indicating whether the sub-sample is a geometry header parameter set;
attribute header flag information indicating whether the sub-sample is an attribute header parameter set; and
geometry slice flag information indicating whether the sub-sample is a point cloud geometry slice.

10. The method according to claim 9, wherein the media file data box of the sub-sample further comprises:
attribute type information indicating a type of a point cloud attribute when the sub-sample is the point cloud attribute slice.

11. The method according to claim 10, wherein
the type of the point cloud attribute is a color attribute when the attribute type information indicates a third value;
the type of the point cloud attribute is a reflectivity attribute when the attribute type information indicates a fourth value; and
the type of the point cloud attribute is the color attribute and the reflectivity attribute when the attribute type information indicates a fifth value.

12. The method according to claim 8, wherein
the point cloud media data includes the point cloud sample encapsulated in an attribute track for encapsulating attribute data; and
header type information indicates a third value in the media file data box of the point cloud sample, and the header type information indicating the third value indicates that that the type of the parameter set is an attribute header.

13. The method according to claim 1, wherein
the point cloud media data includes the plurality of point cloud samples encapsulated in a plurality of tracks,
the media file data box of the point cloud sample includes metadata information corresponding to the plurality of tracks, and
the metadata information includes:
component type information indicating component types of point cloud components encapsulated in the plurality of tracks, the component types including an attribute component of attribute data and a geometry component of geometry data;
attribute number information indicating a number of attribute components encapsulated in the plurality of tracks; and
attribute type information indicating types of the attribute component encapsulated in the plurality of tracks.

14. The method according to claim 13, wherein
the type of the attribute component is a color attribute when the attribute type information of the attribute component indicates a third value;
the type of the attribute component is a reflectivity attribute when the attribute type information of the attribute component indicates a fourth value; and the type of the attribute component includes the color attribute and the reflectivity attribute when the attribute type information of the attribute component indicates a fifth value.

15. The method according to claim 1, wherein the receiving the point cloud media data comprises:
parsing a streaming media transmission from a data source to obtain a component descriptor included in the streaming media transmission, the component descriptor indicating type information and attribute information of a point cloud component encapsulated in a track; and
obtaining the point cloud media data according to the component descriptor.

16. A method for encoding point cloud media, the method comprising:
receiving point cloud data, the point cloud data including a plurality of point cloud frames;
encoding the plurality of point cloud frames to obtain at least a compression unit; and
generating point cloud media data that includes at least the compression unit, the point cloud media data including a plurality of point cloud samples encapsulated in one or more tracks, a media file data box of a point cloud sample in the plurality of point cloud samples including type information that indicates a type of the compression unit, the type of the compression unit being one of a geometry header indicating a parameter set of geometry information, an attribute header indicating a parameter set of attribute information, a geometry slice indicating point cloud slice data of the geometry information, and an attribute slice indicating point cloud slice data of the attribute information, wherein
when one of the one or more tracks is a geometry track for encapsulating geometry data,
slice type information indicates a first value in the media file data box of the point cloud sample, and the first value of the slice type information indicates that a type of the point cloud slice data in the point cloud sample is a point cloud geometry slice, and
attribute slice flag information does not include a second value in a media file data box of a sub-sample of the point cloud sample, and the attribute slice flag information indicating the second value indicates that the sub-sample is a point cloud attribute slice.

17. An apparatus for decoding point cloud media, comprising:
processing circuitry configured to:
receive point cloud media data, the point cloud media data including a plurality of point cloud samples encapsulated in one or more tracks;
obtain at least a compression unit of a point cloud sample in the plurality of point cloud samples, a media file data box of the point cloud sample including type information that indicates a type of the compression unit, the type of the compression unit being one of a geometry header indicating a parameter set of geometry information, an attribute header indicating a parameter set of attribute information, a geometry slice indicating point cloud slice data of the geometry information, and an attribute slice indicating point cloud slice data of the attribute information, wherein
when one of the one or more tracks is a geometry track for encapsulating geometry data,
slice type information indicates a first value in the media file data box of the point cloud sample, and the first value of the slice type information indicates that a type of the point cloud slice data in the point cloud sample is a point cloud geometry slice, and
attribute slice flag information does not include a second value in a media file data box of a sub-sample of the point cloud sample, and the attribute slice flag information indicating the second value indicates that the sub-sample is a point cloud attribute slice;
determine whether the compression unit is to be decoded according to the type information; and
decode the compression unit to obtain point cloud data based on the compression unit being determined to be decoded.

18. The apparatus according to claim 17, wherein the media file data box of the point cloud sample further comprises:
component header number information indicating a number of parameter sets in the point cloud sample; and
slice number information indicating a number of point cloud slices in the point cloud sample.

19. The apparatus according to claim 18, wherein a parameter set of the point cloud sample is included in decoder configuration information when the component header number information has a value of 0.

* * * * *